United States Patent
Parker

(10) Patent No.: US 6,389,430 B1
(45) Date of Patent: May 14, 2002

(54) REAL-TIME DATABASE OBJECT STATISTICS COLLECTION

(75) Inventor: Christopher F. Parker, Round Rock, TX (US)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/349,197

(22) Filed: Jul. 7, 1999

(51) Int. Cl.[7] .............................................. G06F 17/30
(52) U.S. Cl. ...................................... 707/202; 707/200
(58) Field of Search ................................ 707/200, 201, 707/202; 701/101, 6, 103, 100; 379/112.1, 113

(56) References Cited

U.S. PATENT DOCUMENTS

| | | | |
|---|---|---|---|
| 5,043,866 A | | 8/1991 | Myre, Jr. et al. |
| 5,430,871 A | * | 7/1995 | Jamoussi et al. ........... 707/202 |
| 5,701,471 A | | 12/1997 | Subramanyam |
| 5,721,915 A | * | 2/1998 | Sockut et al. ............... 707/200 |
| 5,758,355 A | | 5/1998 | Buchanan |
| 5,778,350 A | | 7/1998 | Adams et al. |
| 5,852,818 A | | 12/1998 | Guay et al. |
| 6,115,722 A | * | 12/1998 | Isip, Jr. et al. ............... 707/202 |
| 5,907,844 A | * | 5/1999 | Guay et al. .................. 707/100 |
| 5,946,486 A | * | 8/1999 | Pekowski ..................... 707/103 |
| 6,002,753 A | * | 12/1999 | Morrison et al. ........... 379/113 |
| 6,078,918 A | * | 6/2000 | Allen et al. ..................... 707/6 |
| 6,119,128 A | * | 9/2000 | Courter et al. .............. 707/202 |
| 6,178,427 B1 | * | 1/2001 | Parker ......................... 707/202 |
| 6,192,365 B1 | * | 2/2001 | Draper et al. ............... 707/101 |

* cited by examiner

*Primary Examiner*—Hosain T. Alam
*Assistant Examiner*—Anh Ly
(74) *Attorney, Agent, or Firm*—Baker & McKenzie

(57) ABSTRACT

A system for collecting database object statistics by a database management system selects one or more objects and corresponding one or more object fields and then creates a base set of statistics for the selected object fields. The system further reads active log records and updates the base set of statistics when a change is read in the active log records. Finally, the system begins extracting log records when an end-of-file of the active log records is reached, and updates the updated statistics based on the extracted log records.

14 Claims, 2 Drawing Sheets

REAL-TIME DATABASE OBJECT STATISTICS COLLECTION

FIELD OF THE INVENTION

The present invention is directed to computer databases. More particularly, the present invention is directed to the collection of computer database object statistics.

BACKGROUND OF THE INVENTION

The performance of databases and database management systems ("DBMS"s) is critical to many corporations to meet the need of their customers. Customers desire timely and accurate information, and this information is frequently retrieved by an application program interfacing with a database. Poor performance of a database is usually due to inefficient structured query language ("SQL") by the application program, or inefficient access path selection by the database and DBMS.

Most DBMSs, such as the DB2 relational DBMS from IBM Corp., use database object statistics to determine access paths. The access paths may be determined at plan bind time, or at execution time in the case of dynamic SQL. In either case, if the statistics are not up to date the access path selected may not be optimal.

Products are available for collecting statistics of database objects. Examples of these prior art products are "RUN-STATS" from IBM Corp., and the "Database Analyzer" from Platinum technology inc. However, one drawback with these products is that they must be run in batch mode, which is time consuming. A further drawback is that if the highest accuracy is desired, the database objects must be in a read-only state during statistics collection.

Based on the foregoing, there is a need for a system and method for collecting and maintaining database object statistics on a real-time basis without limiting the database objects to read-only status during collection.

SUMMARY OF THE INVENTION

One embodiment of the present invention is a system for collecting database object statistics by a database management system. The system selects one or more objects and corresponding one or more object fields and then creates a base set of statistics for the selected object fields. The system further reads active log records and updates the base set of statistics when a change is read in the active log records. Finally, the system begins extracting log records when an end-of-file of the active log records is reached, and updates the updated statistics based on the extracted log records.

DETAILED DESCRIPTION

Figure 1:
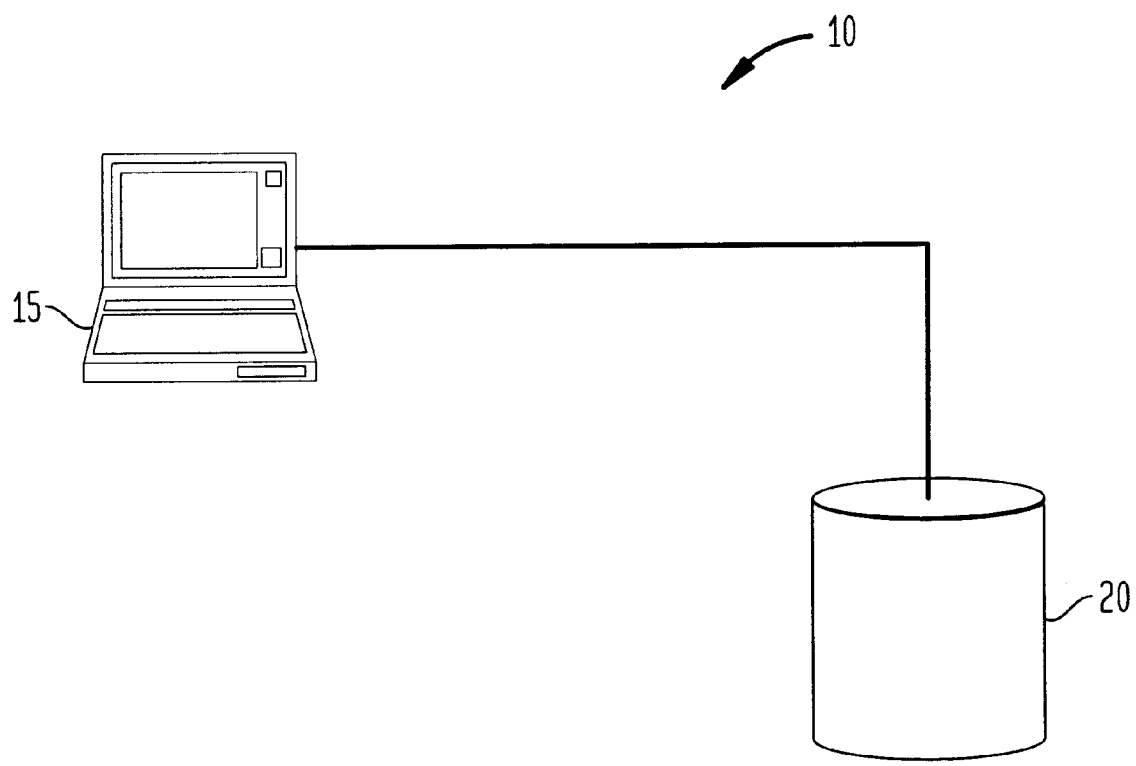
FIG. 1 is a block diagram of a system that can implement one embodiment of the present invention.

FIG. 1 is a block diagram of a system that can implement one embodiment of the present invention. The database object statistics collection system 10 includes a computer 15 coupled to a database 20. Computer 15 can be any general purpose computer that includes at least a processor and a memory device (not shown).

Computer 15 executes a DBMS that interacts with database 20. In the embodiment described herein, the DBMS is DB2 from IBM Corp. However, any other DBMS can be used that is capable of responding to the steps described below in conjunction with FIG. 2.

Database 20 is comprised of stored database objects. Examples of database objects include a table, a tablespace, an index, an index space, etc. Various statistics may be collected and monitored for each database object. For example, it may be desired to collect the number of rows included in each table, or the number of active pages in a tablespace. These statistics allow the DBMS to generate optimized access paths to database 20.

Each table in database 20 includes a log record. Each log record is a record of changes that were made to its corresponding table, and can be used to rebuild a table in the event of a problem.

Figure 2:
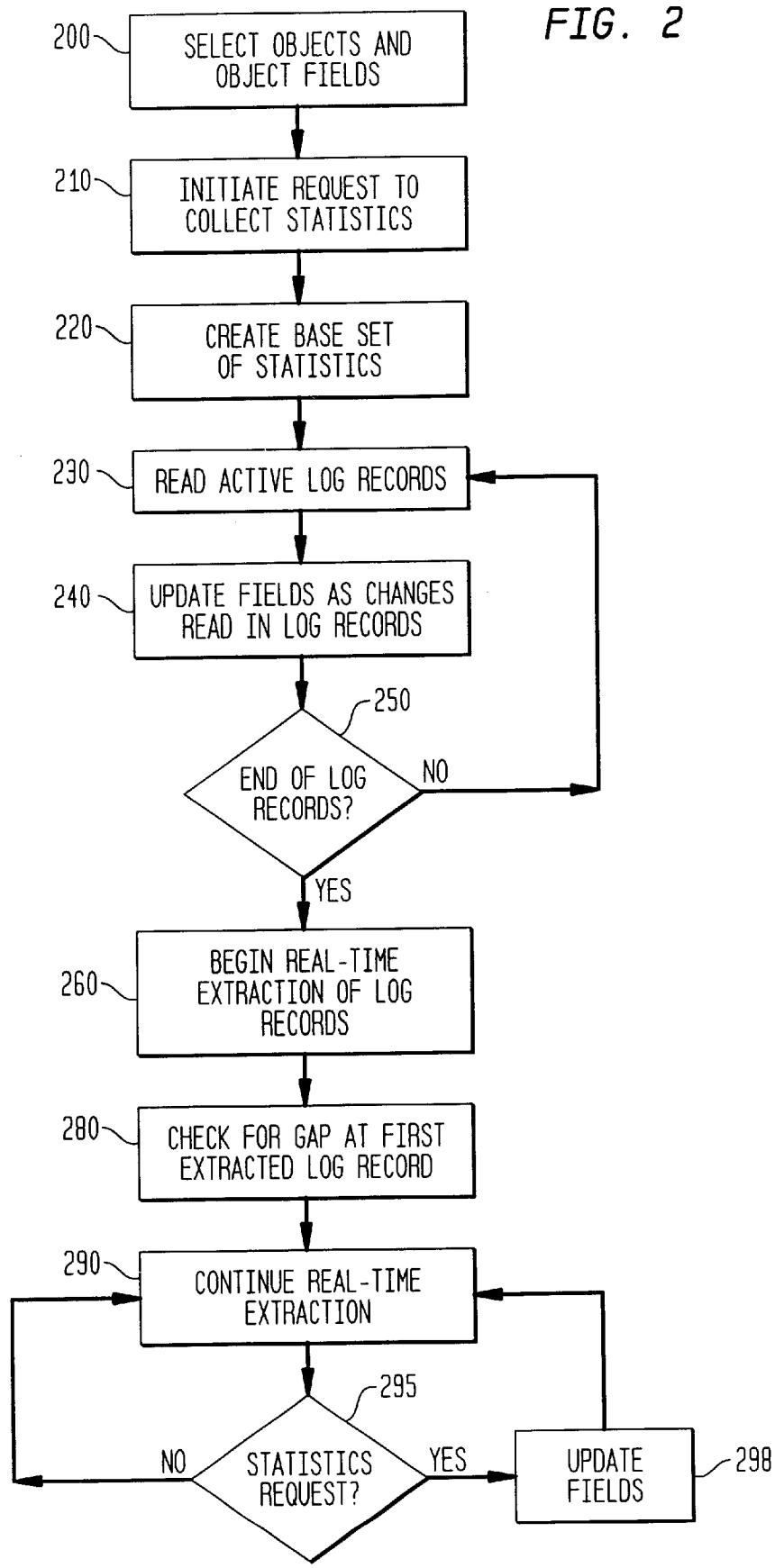
FIG. 2 is a flowchart of the steps performed by the system in accordance with one embodiment of the present invention.

Computer 15 stores in its memory device a set of instructions that, when executed by the processor, allow the DBMS to perform real-time collection of database object statistics in accordance with one embodiment of the present invention. FIG. 2 is a flowchart of the steps performed by system 10 in accordance with one embodiment of the present invention.

At step 200, at least one database object is selected to collect statistics on, and the statistic fields from the objects are also selected. Examples of database objects include a table and a tablespace. An example of a field for a table is the "number of rows in the table". An example of a field for a tablespace is the "number of active pages in the tablespace." In one embodiment, the fields are columns within a DB2 catalog and are used to optimize access paths to database 20.

At step 210, a request is initiated to begin collecting statistics for the objects and the corresponding object fields selected in step 200.

At step 220, a base set of statistics are created by reading the entire contents of database 20 and extracting statistics information for the selected objects and fields. Step 220 can be implemented using a known statistics retrieval product such as the "Database Analyzer" from Platinum technology inc.

After the base set of statistics is established, at step 230 the active and archived log records are read. At step 240, the selected fields are updated as changes are read in the log records.

At step 250, it is determined whether the end-of-file of the active log is reached. If the end-of-file has not been reached, step 230 is continued. If the end-of-file of the active log has been reached, system 20 stops reading active log records.

At step 260, a real time extraction of log records is begun by examining log records before they are written to the active log. In one embodiment, the DB2 "Log Exit" function is executed to implement the extraction. Log Exit is a known DB2 application program interface ("API"), but any method available for extracting log records in real time can be used in the present invention.

At step 280, system 10 checks for a gap between the first live log record extracted and the last log record read at step 230. If a gap exists, the gap is processed by rereading the active log from the log record that corresponded to the end-of-file through the first live log record extracted. This insures that no log records were missed between end-of-file and the first extracted log record.

After the gap has been checked and processed, at step 290 the real time extraction of log records is continued.

At step 295, it is determined whether a request is issued by a user to refresh the statistics. If a request is issued, at step 298 the statistic fields are updated and the up-to-date database statistics are made available to the user. Step 290 then continues until an additional refresh request is issued or a request to stop the process is received. In one embodiment, the statistics are refreshed instantly by accessing the desired field and updating the database catalog.

In another embodiment, instead of waiting for a refresh request at step 295, the fields are continuously updated when changes are encountered as the log records are extracted. In this embodiment, the fields, and therefore the statistics, may be continuously displayed to the user. This allows the user to constantly monitor the database statistics.

As disclosed, the system and method in accordance with one embedment of the present invention allows a user to collect and monitor statistics in real-time or on demand, therefore providing highly accurate and timely statistical information to the user.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of collecting database object statistics by a database management system (DBMS), said method comprising:

(a) selecting one or more objects and corresponding one or more object fields;

(b) creating a base set of statistics for the selected object fields;

(c) reading active log records;

(d) updating the base set of statistics when a first change is read in the active log records;

(e) when an end-of-file of the active log records is reached, begin extracting log records; and (f) updating the updated statistics based on the extracted log records.

2. The method of claim 1, wherein step (f) is executed in response to a user request.

3. The method of claim 1, wherein step (f) is executed in response to a second change read in the extracted log records.

4. The method of claim 1, further comprising:

checking for a gap when a first log record is extracted.

5. The method of claim 4, wherein checking for a gap comprises:

rereading the active log records from the active log record corresponding to the end-of-file through the first extracted log record.

6. The method of claim 1, wherein the DBMS is DB2.

7. The method of claim 6, wherein step (e) comprises executing a log exit function.

8. A system for collecting database object statistics by a database management system (DBMS), said system comprising:

means for selecting one or more objects and corresponding one or more object fields;

means for creating a base set of statistics for the selected object fields;

means for reading active log records;

means for updating the base set of statistics when a first change is read in the active log records;

means for begin extracting log records when an end-of-file of the active log records is reached; and means for updating the updated statistics based on the extracted log records.

9. The system of claim 8, wherein said means for updating the updated statistics is executed in response to a user request.

10. The system of claim 9, wherein said means for updating the updated statistics is executed in response to a second change An read in the extracted log records.

11. The system of claim 8, further comprising:

means for checking for a gap when a first log record is extracted.

12. The system of claim 11, wherein said means for checking for a gap comprises:

means for rereading the active log records from the active log record corresponding to the end-of-file through the first extracted log record.

13. The system of claim 8, wherein the DBMS is DB2.

14. The system of claim 13, wherein said means for begin extracting log records comprises executing a log exit function.

* * * * *

UNITED STATES PATENT AND TRADEMARK OFFICE
CERTIFICATE OF CORRECTION

PATENT NO.     : 6,389,430 B1
DATED          : May 14, 2002
INVENTOR(S)    : Christopher F. Parker It is certified that error appears in the above-identified patent and that said Letters Patent is hereby corrected as shown below:

Column 3,
Line 25, cancel beginning with "1. A method of collecting" to and including "log records."
Line 30, insert the following claim:
   1. A method of collecting database object statistics by a database management system (DBMS) for optimizing one or more access paths, said method comprising:
   (a) selecting one or more objects and corresponding one or more object fields, the one or more objects used in DBMS operations;
   (b) creating a base set of statistics for the selected object fields;
   (c) reading active log records;
   (d) updating the base set of statistics when a first change is read in the active log records;
   (e) when an end-of-file of the active log records is reached, begin extracting log records; and;
   (f) updating the updated statistics based on the extracted log records.

UNITED STATES PATENT AND TRADEMARK OFFICE
CERTIFICATE OF CORRECTION

PATENT NO. : 6,389,430 B1
DATED : May 14, 2002
INVENTOR(S) : Christopher F. Parker It is certified that error appears in the above-identified patent and that said Letters Patent is hereby corrected as shown below:

Column 4,
Line 11, cancel beginning with "8. A system for collecting database" to and including "extracted log records."
Line 24, and insert the following claim:
  8. A system for collecting database object statistics by a database management system (DBMS) for optimizing one or more access paths, said system comprising:
    means for selecting one or more objects and corresponding one or more object fields, the one or more objects used in DBMS operations;
    means for creating a base set of statistics for the selected object fields;
    means for reading active log records;
    means for updating the base set of statistics when a first change is read in the active log records;
    means for begin extracting log records when an end-of-file of the acitve log records is reached; and
    means for updating the updated statistics based on the extracted log records.

Signed and Sealed this

Sixth Day of April, 2004

JON W. DUDAS
*Acting Director of the United States Patent and Trademark Office*